US011475362B2

(12) United States Patent
Jobling et al.

(10) Patent No.: US 11,475,362 B2
(45) Date of Patent: Oct. 18, 2022

(54) MACHINE LEARNING QUERY HANDLING SYSTEM

(71) Applicant: International Consolidated Airlines Group, S.A., Madrid (ES)

(72) Inventors: Daniel Jobling, Middlesex (GB); Glenn Morgan, Middlesex (GB); Paul Shade, Middlesex (GB); Andrew May, Middlesex (GB)

(73) Assignee: International Consolidated Airlines Group, S.A., Madrid (ES)

( * ) Notice: Subject to any disclaimer, the term of this patent is extended or adjusted under 35 U.S.C. 154(b) by 337 days.

(21) Appl. No.: 16/648,584

(22) PCT Filed: Sep. 25, 2018

(86) PCT No.: PCT/GB2018/052723
§ 371 (c)(1),
(2) Date: Mar. 18, 2020

(87) PCT Pub. No.: WO2019/063988
PCT Pub. Date: Apr. 4, 2019

(65) Prior Publication Data
US 2020/0219010 A1    Jul. 9, 2020

(30) Foreign Application Priority Data
Sep. 28, 2017   (GB) ...................................... 1715738

(51) Int. Cl.
*G06N 20/00*      (2019.01)
*G06F 16/953*     (2019.01)

(52) U.S. Cl.
CPC ........... *G06N 20/00* (2019.01); *G06F 16/953* (2019.01)

(58) Field of Classification Search
None
See application file for complete search history.

(56) References Cited

U.S. PATENT DOCUMENTS

| 8,768,870 | B1 | 7/2014 | Corrado et al. |
| 2015/0169738 | A1* | 6/2015 | Duerig .................... G06F 16/51 |
| | | | 707/E17.084 |

(Continued)

FOREIGN PATENT DOCUMENTS

CN          106575246 A    *  4/2017    ........... G06F 9/5066

OTHER PUBLICATIONS

International Search Report dated Jan. 8, 2019 for International Appl. No. PCT/GB2018/052723, 4 pages.

(Continued)

*Primary Examiner* — Natisha D Cox
(74) *Attorney, Agent, or Firm* — Sterne, Kessler, Goldstein & Fox P.L.L.C.

(57) ABSTRACT

Systems and methods for a machine learning query handling platform are described, whereby each computing node in a computer network is configured to implement a respective local prediction model that calculates an output based on input attributes passed through trained parameters of the local prediction model, whereby at least two of the computing nodes calculate different predicted outputs to the same input attributes. In an embodiment, the trained parameters of each local prediction model include a first set of parameters received from a remote server, a second set of parameters received from another interconnected computing node, and a third set of parameters based on data in a local memory. Other embodiments are also described and claimed.

20 Claims, 7 Drawing Sheets

(56) References Cited

U.S. PATENT DOCUMENTS

2015/0324690 A1    11/2015  Chilimbi et al.
2017/0124487 A1*    5/2017  Szeto .................. G06F 11/1448
2021/0390455 A1*   12/2021  Schierz .................... G06N 5/04

OTHER PUBLICATIONS

Written Opinion dated Jan. 8, 2019 for International Appl. No. PCT/GB2018/052723, 8 pages.

* cited by examiner

MACHINE LEARNING QUERY HANDLING SYSTEM

FIELD OF THE INVENTION

This invention relates generally to a data query processing system, and more particularly to a machine learning query handling platform.

BACKGROUND

Data processing systems for query handling are generally known, in which one or more backend servers are typically provided to receive and process queries from remote computing entities across a data network. Such conventional system architectures are particularly common in the context of queries for data relating to perishable units, such as time-limited goods or tokens, relying on the backend servers to maintain a single source of up-to-date data, such as availability, stock, demand, etc. With increases in the number of computing entities, the number of queries per entity, such conventional system architectures are prone to computer processing bottlenecks, as the backend servers must be involved in each and every data request. Additional issues arise as the complexity of data processing per query increases, for example with greater numbers of available parameters and user customisable options supported by the query handling system.

What is desired is a better data processing system and method for dynamic query handling that enables greater computing efficiencies and scalability.

SUMMARY OF THE INVENTION

Aspects of the present invention are set out in the accompanying claims.

According to one aspect, the present invention provides a method comprising storing, at a first computing device in a computer network, data defining a local prediction model including: a first set of trained parameter values received from a remote server in the computer network that maintains at least one temporally-dependent attribute of a plurality of perishable units, a second set of trained parameter values received from a second computing device in the computer network, and a third set of local parameter values generated by the first computing device. The method further comprises applying, by the first computing device, a machine learning model to compute updated parameter values of a trained local prediction model based at least on data associated with the first computing device; and processing, by the first computing device, a data query using the trained local prediction model, to identify at least one perishable unit and to predict a value of the at least one temporal query attribute of the or each identified perishable unit.

The data query may be processed using the updated parameter values of the trained local prediction model and data retrieved from a memory of the first computing device. The data query may further comprise query attributes including the data retrieved from the memory of the first computing device. The query attributes may further include data retrieved from a plurality of disparate data sources. Processing the data query using the updated parameters of the local prediction model may further identify a predicted query type.

The method may further comprise initialising a query vector representing query attributes of the data query, and passing the query vector as input to the trained prediction model. The data query may be received by the first computing device from a different computing device on the network. The predicted output may be provided as feedback to a query handling controller of the first computing device.

The method may further comprise transmitting, by the first computing device, the updated first set of parameters of the local prediction model to the remote server. The predicted value may be one or more of a probabilistic, heuristic and deterministic property of the identified perishable unit.

The third set of local parameter values may be initialised, by the first computing device, with random values. The updated parameter values of the trained local prediction model may be computed based on a training data set that includes data associated with the first computing device. The training data set may include metadata associated with a plurality of perishable units. The training data set may further include output attributes associated with metadata of the plurality of perishable units in the data set. The training data set may include: a first data subset received from the remote server, a second data subset received from the second computing device, and a third data subset retrieved from a local memory of the first computing device.

The data associated with the first computing device may include one or more of location data, calendar data, accelerometer data, gyroscope data, user settings, third party application data, and device type.

The third set of local parameter values may define weighting values for corresponding ones of the first set of trained parameter values.

According to another aspect, the present invention provides a method for analysing a plurality of input attributes to determine in real-time one or more output temporally-dependent attributes of a perishable unit, the method comprising, at a computing device, predicting said output attributes in accordance with a local prediction model that calculates an output based on input attributes passed through trained parameters of the local prediction model, wherein the local prediction model includes a first sub-model based on trained parameters received from a remote server, a second sub-model based on trained parameters received from another computing device, and a third sub-model based on parameters trained from local data associated with the computing device.

A learning model may be applied at the server as a first training operation to update parameters of the first sub-model using a first data set, and transmitting the updated parameters to the computing device. The learning model may be applied at the computing device, as a second training operation to update at least the parameters of the third sub-model based on a second data set. Applying the learning model to update the third sub-model may also updates the parameters of the first and second sub-models.

At least a portion of the updated parameters of the third sub-model may be transmitted to another computing device. The parameters of the local prediction model may be iteratively updated based on new input data.

According to yet another aspect, the present invention provides a machine learning query handling system comprising a plurality of interconnected computing nodes each implementing a respective local prediction model that calculates a predicted output based on input attributes passed through trained parameters of the local prediction model, wherein the trained parameters of each local prediction model include a first set of parameters received from a remote server, a second set of parameters received from another interconnected computing node, and a third set of parameters based on data in a local memory, whereby at least two of the computing nodes are configured to calculate different predicted outputs to the same input attributes.

In other aspects, there are provided apparatus and systems configured to perform the methods as described above. In a further aspect, there is provided a computer program comprising machine readable instructions arranged to cause a programmable device to carry out the any one of the methods as described above.

BRIEF DESCRIPTION OF THE DRAWINGS

There now follows, by way of example only, a detailed description of embodiments of the present invention, with references to the figures identified below.

DESCRIPTION OF EMBODIMENTS

Specific embodiments of the invention will now be described, directed to a query handling machine learning system architecture that facilitates real-time query processing by each one of a plurality of interconnected computing nodes using a respective local prediction model, without reliance on a request for data or processing by a central server node or data source to resolve a particular query. Machine learning is generally concerned with designing and developing algorithms to analyse large datasets and recognise new and complex patterns, correlations, trends, relationships, etc. in the data. Typically, machine learning algorithms implement an underlying model defined by parameters that are optimised to minimise a cost function of the model, given input data. In the described embodiments, each local prediction model enables machine prediction of the query intent/purpose and/or the query result, taking into account local empirical data for device/user specific predictive analytics.

The system architecture implements one or more server nodes to train a core prediction model, and a plurality of interconnected computing nodes for distributed training of respective local prediction models based on the core prediction model. The machine learning system architecture can also learn and predict portions of the prediction model data structures to be shared between determined groupings of computing nodes, the shared portions being used at recipient computing nodes in conjunction with core and local portions of the prediction model.

Figure 1:
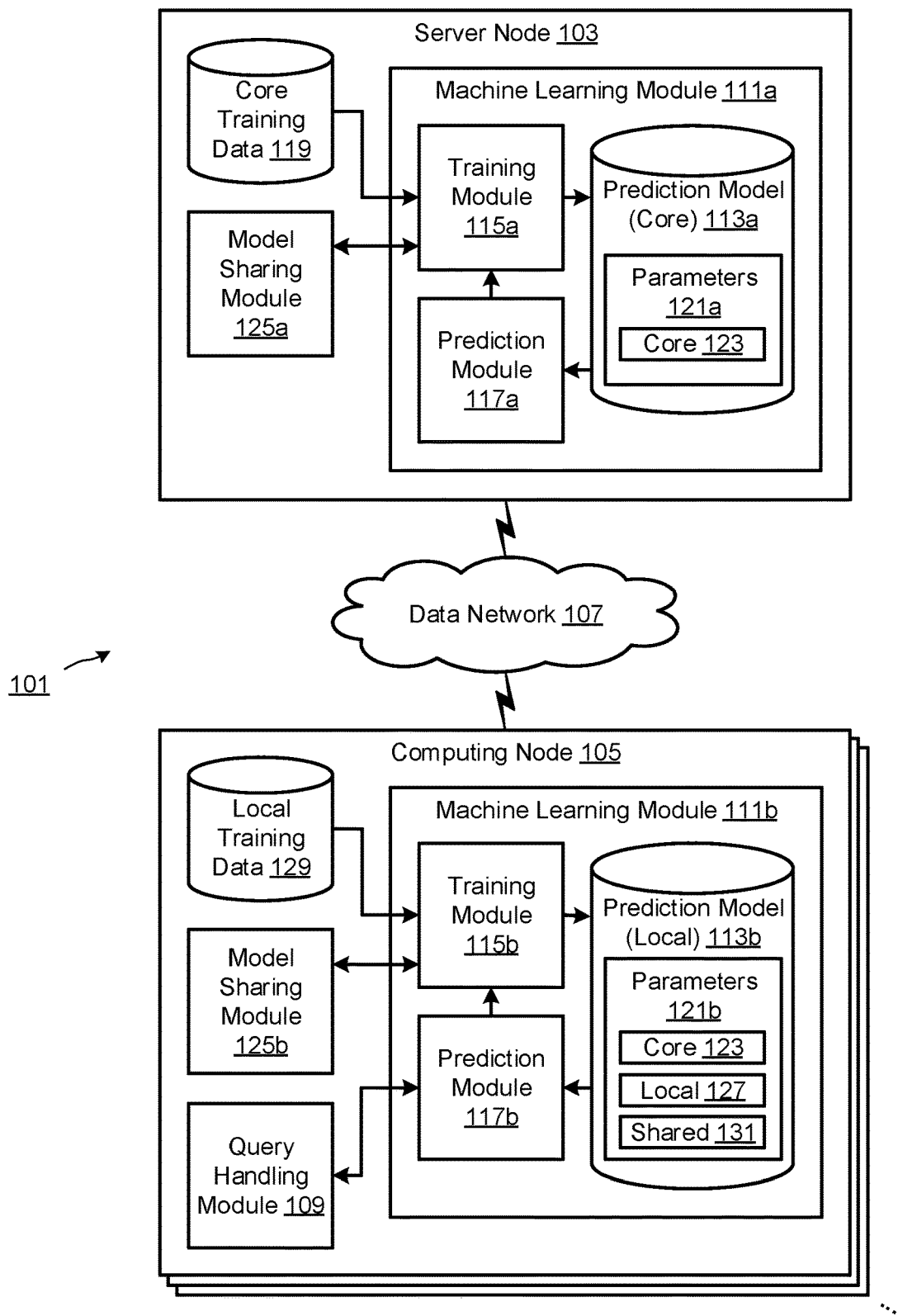
FIG. 1 is a data flow block diagram showing the main components of a query handling system according to an embodiment of the invention.

Referring to the data flow block diagram of FIG. 1, a query handling system 101 according to an embodiment includes a server node 103 communicatively interconnected to a plurality of geographically distributed computing nodes 105 by communication links and segments of a data network 107. The computing nodes 105 may be computing devices associated with one or more users, such as a personal computer, a laptop, a computing terminal, a smart phone, a tablet computer, or the like. Additionally or alternatively, the computing nodes 105 may be interconnected query handling routers defining processing edges of a data processing network, each router configured to handle queries transmitted from a plurality of local connected computing devices. The data network 107 may be any suitable data communication network or combination of networks, such as a wired or wireless network, ranging from a local to wide area network, or a cellular communication network such as Global System for Mobile Communications (GSM), General Packet Radio Service (GPRS), Code Division Multiple Access (CDMA), CDMA2000, Enhanced Data Rates for GSM Evolution (EDGE), Evolved High-Speed Packet Access (HSPTA+), Long Term Evolution (LTE), etc.

Each computing node 105 includes a query handler module 109b for processing data queries, based on predicted outputs determined by a prediction module 117b using a corresponding local prediction model 113b that is specific to that computing node 105. Each received query may include data defining a plurality of query attributes that resolve to one or more output values, depending on the designated implementation context. The server node 103 may also include a corresponding query handler module (not shown), for example to handle queries using a core prediction model 113a and local data maintained by the server node 103.

The server node 103 and each computing node 105 include a respective machine learning module 111 for generating the corresponding prediction models 113. The distributed training framework of the present system 101 implements the prediction model training process in at least two stages: a core prediction model 113a training stage by the server node 103, followed by respective local prediction model 113b training stages by the computing nodes 105. Each machine learning module 111 includes a training module 115 for distributed training of a corresponding prediction model 113, and a prediction module 117 for using the trained prediction model 113 to predict outputs of input data queries.

The training module 115a of the server node 103 generates the core prediction model 113a by processing training data sets from a core training data corpus 119 input to the training module 115a. The prediction model 113a is defined by a set of trained parameter values 121a, including a set of core parameters values 123 that are transmitted by a model sharing module 125a of the server node 103 to the plurality of computing nodes 105. Each computing node 105 receives the core parameters 123 defining a core sub-model of the local prediction model 113b, via a respective model sharing module 125b. The training module 115b of each computing node 105 trains a respective set of local parameters 127 defining a local sub-model of the local prediction model 113b, for example by processing data sets from a corresponding local training data corpus 129 input to the training module 115b. Alternatively, the training module 115b of each computing node 105 may initialise core parameters 123 of the location prediction model 113b with the trained values received from the server node 103, and initialise local parameters 127 of the local prediction model 113*b* with random values, before re-training the local prediction model 113*b* to optimise the core and local parameter values.

The training module 115*b* of each computing node 105 may also determine a subset of the local parameters 127 that are to be shared with other interconnected computing nodes, via the model sharing module 125*b*. In this way, each of the local prediction models 113*b* at a particular computing node 105 is defined by a plurality of sets of trained parameters 121*b* distributed across the system 101: a first set of core parameters 123 trained by and received from the server node 103, a second set of local parameters 127 trained by the training module 115*b* of the respective computing node 105, and optionally, a third set of shared parameters 131 as received from one or more other interconnected computing nodes via the model sharing module 125*b*. Each set of trained parameters may define a trained sub-model of the local prediction model 113. Re-training of the local prediction model 113*b* may thereby be performed by the training module 115*b* of each computing node 105 to optimise the core, shared and local parameter values for that particular computing node 105 and/or user associated with the node. Optionally, changes to the core parameters 123 by a computing node 105, for example after re-training of a local prediction model 113*b*, may be communicated back to the server node 103 to update the core prediction model 113*a*.

The model sharing modules 125 may be configured to determine a subset of other interconnected computing nodes 105 that are to receive the determined subset of trained local parameters 127 as a set of shared parameters 131 from a particular computing node 105. For example, data defining groupings of identified computing nodes 105 may be distributed between the identified computing nodes 105, and used by the model sharing module 125*b* of a computing node 105 in the group to target distribution of the shared parameters 131 between other computing nodes 105 in the group. Additionally or alternatively, model sharing modules 125 may be configured to distribute shared parameters 131 to one or more subsets of other interconnected computing nodes 105 based on geographical and/or network proximity to the distributing computing node 105.

The training modules 115 learn direct and indirect relationships between collections of attributes or features from a training data corpus 119,129. The training modules 115 implement one or more known machine learning algorithms, such as neural networks, multilayer perceptron, radial basis function networks, support vector machines, Bayesian probability modelling, k-nearest neighbours, geospatial predictive modelling, etc., to train the prediction model 113. A common feature of such known machine learning algorithms is that the model 113 defines a plurality of parameters having respective trained values that are optimised based on training data, such as one or more training data corpus 119,129 of data sets of attributes associated with one or more output and/or output criterion values.

It is appreciated that the precise data structure of the sets of parameters 121 defining the prediction model 113 will depend on the designated implementation context, the machine learning algorithms implemented by the machine learning modules 111, and the attribute/feature space of the training data and query data. For example, in a neural network or perceptron based machine learning implementation, the trained model parameters 121 may be weights assigned to input and/or output nodes, with input nodes corresponding to attributes or features in the training data sets 119,129. The number of nodes in the input layer may correspond to the number of possible attributes types in the training and query data, the number of nodes in the output layer may correspond to the number of output values for the designated context, and the number of nodes in one or more hidden layers may be defined and/or dynamically adjusted also depending on the designated context.

In such an implementation, the trained parameters 121 correspond to computed weights between respective nodes, that are affected based on the features learned from the multiple data sets. Each weight may be labelled and assigned by the training module 115 to one or more of the set of core parameters 123, the set of local parameters 127, and the set of shared parameters 131. Alternatively or additionally, the plurality of input nodes may be divided into three subsets of input nodes, with the weights associated with the input nodes in each subset corresponding to the core, shared and local parameters. The optimised weight values may form a weight matrix defining the trained parameters of the prediction model 113, including non-overlapping sets of core weights 123 from the server node 103, local parameters 127 trained by each respective computing node 105, and shared parameters 131 from other interconnected computing nodes.

As another example, in a Bayesian model based implementation, the trained parameters 121 of each Bayesian sub-model may be determined parameters of probability distribution for an output attribute or feature, given one or more input attributes or features. In such an example, trained parameters 121 of the local sub-model may define optimised weighting values indicative of probability of relevance of associated attributes or features to the particular local computing node 105 (or a user associated with that node), which may be applied as localised weightings of the optimised parameters of the core sub-model.

The trained prediction model 113 can then be used to determine a prediction value for predicting the output of an input query, by loading the trained parameters values into the prediction module 117 and feeding the query attribute values as inputs to the trained local prediction model 113*b* to determine the predicted output value or values. The prediction module 117 can receive and use the trained prediction model 113 from the training module 115 to determine one or more prediction values in response to requests from a query handler module 109, where the query handler module 109 can utilize the predicted output values to resolve the received query. The query handler module 109 can be coupled to a user interface that receives input query attributes in the same feature space as the training data sets 119,129. The trained parameters 121 can be used to accurately determine a predicted output for a given query that includes new or previously unseen query attributes and/or query attribute values. The trained parameters 121 can also be used to accurately predict an intended purpose or type of the received query, for even greater query handling accuracy. Additionally, the trained parameters 121 may be used to accurately predict one or more attribute or feature values maintained by the server node 103, for example when processing input query attributes to determine a predicted output.

Each of the modules in the server node 103 and computing node 105 may be instantiated as a multi-threaded computer process running on one or more computing devices. It should be appreciated that the system 101 may include other components, sub-components, modules, and devices commonly found in a computing system/device, which are not illustrated in FIG. 1 for clarity of the description.

Figure 2:
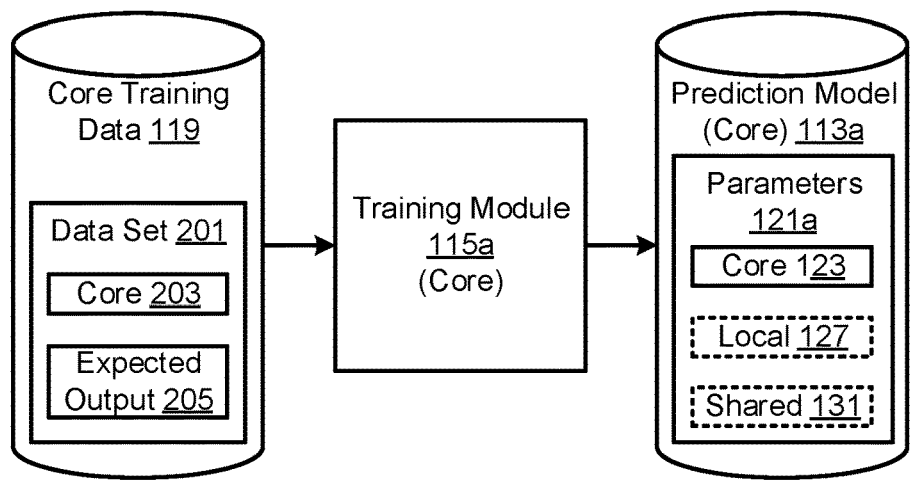
FIG. 2 is a data flow diagram of a core prediction model training stage by the training module of the server node shown in FIG. 1.

FIG. 2 is a data flow diagram of a core prediction model training stage by the training module 115*a* of the server node 103, according to an embodiment. In the core training stage, the training module 115a can initiate learning of a new prediction model 113a by loading core training data 119 into a working memory of the server node 103. An individual training data set 201 of the core training data 119 may include a collection of core attribute or feature values 203, associated with one or more expected output or output criterion values 205. For example, in a supervised learning based machine learning algorithm, each individual core data set 201 can include feature representatives of a collection of core data objects 203 and one or more labels indicating respective expected output values 205, based on a correlation between the core data objects 203 in the collection. The core training data 119 may be stored in one or more memory or storage modules of the server node 103 and/or at one or more remote data storage servers (not shown). Alternatively, in an unsupervised or reinforcement learning based machine learning algorithm, the training data 119 is unlabelled and output criterion defined, for example based on optimisation thresholds and/or defined rewards.

The training module 115a executes the implemented machine learning algorithm(s) to train the core portion of the prediction model 113a based on data sets 201 from the core training data 119, for example by adjusting values of the core parameters 123 of the core prediction model 113a until a defined threshold training criterion is met. The prediction model 113a data structure may include sets of parameters allocated to the untrained, randomly initiated, or null local parameters 127, and shared parameters 131, schematically illustrated as dashed line block elements in FIG. 2.

Figure 3:
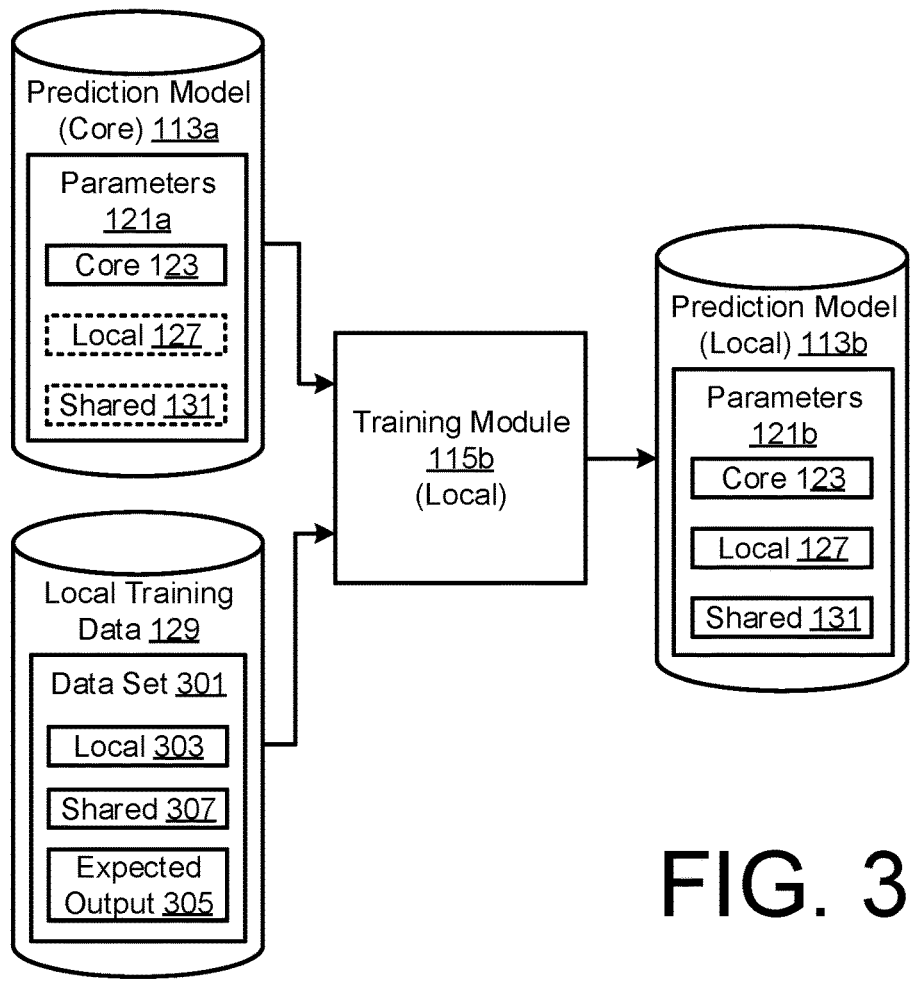
FIG. 3 is a data flow diagram of a local prediction model training stage by a training module of a computing node shown in FIG. 1.

FIG. 3 is a data flow diagram of a local prediction model training stage by a training module 115b of a computing node 105, according to an embodiment. In the local training stage, the training module 115a can initiate re-training of a received core prediction model 113a as a new local prediction model 113b by loading local training data 129 into a working memory of the server node 103. The local training data 129 may be stored in one or more local memory or storage modules of the computing node 105 and/or at one or more remote data storage servers (not shown).

Similar to the core training data 119, individual training data sets 301 of the local training data 129 can include a collection of local attribute or feature values 303, associated with one or more expected output or output criterion values 305. The individual local training data sets 301 may also include a collection of shared attribute or feature values 307, received or retrieved for example from one or more other computing nodes 105 and/or an external data source (not shown). For example, each individual local data set 301 can include: i) feature representatives of a collection of local data objects 303 that relate to that particular computing node 105 and/or a user of that computing node 105, ii) feature representatives of a collection of shared data objects 307 that relate to other interconnected computing nodes 105 and/or respective users of those other computing nodes 105, and iii) one or more labels indicating respective expected output values 305, based on a correlation between the local and shared data objects 303,307 in the collection.

The training module 115b executes the implemented machine learning algorithm(s) to train the local and shared portions of the prediction model 113b based on data sets 301 from the local training data 129, for example by adjusting values of the local parameters 127 and shared parameters 131 of the local prediction model 113b until the defined threshold training criterion is met.

Figure 4:
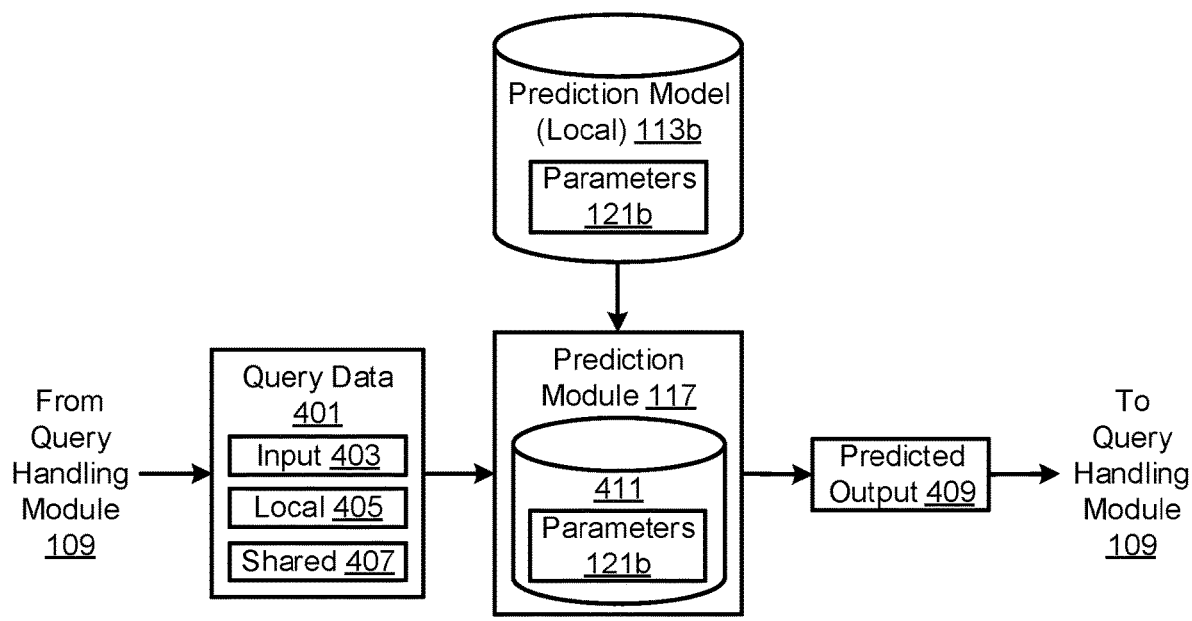
FIG. 4 is a data flow diagram of an output prediction stage by a prediction module of a server node or computing node.

FIG. 4 is a data flow diagram of an output prediction stage by a prediction module 117 of a computing node 105, according to an embodiment. In a query handling stage, the query handling module 109 can receive user input 403 for a new query to the system 101. The query handler module 109b of a computing node 105 can be implemented as a processing module having a user interface for receiving input of query attributes. The query handling module 109 can also retrieve local data 405 and/or shared data 407 to supplement the new query, the supplemental data representative of additional attributes available at the time the query handling module 109 receives the input query, which may be taken into account in the determination of the corresponding predicted output. The query handling module 109 passes the user input data 403 and any retrieved local data 405 and/or shared data 407 as query data 401 to the prediction module 117 of the server node 103 or computing node 105 that is handling the new query. The prediction module 117 receives and processes the query data 401 to compute a predicted output 409 based on the received query attributes, by loading the trained parameters 121b of the local prediction model 113b into a local working memory 411, and feeding the query attribute values as inputs to the trained local prediction model 113b to determine the predicted output value or values. The predicted output 409 can be passed back to the query handling module 109 as a response to the received query data 401.

Additionally or alternatively, the query handling module 109 may be implemented at the server node 103, for example as an application programming interface (API) or a web-based service, for receiving input queries from a thin query handling user interface of a remote computing device that may not be configured with a local machine learning module 111b. The new query can define for example input data query attributes in the same feature space as the training data sets 119,129. The server node 103 may process the data queries using the core prediction model 113a and data from a local database that is maintained by the server node 103. In such an embodiment, the core prediction model 113a may be updated regularly based on updated core parameters 123 of local prediction models 113b received from the plurality of computing nodes 105.

Figure 5:
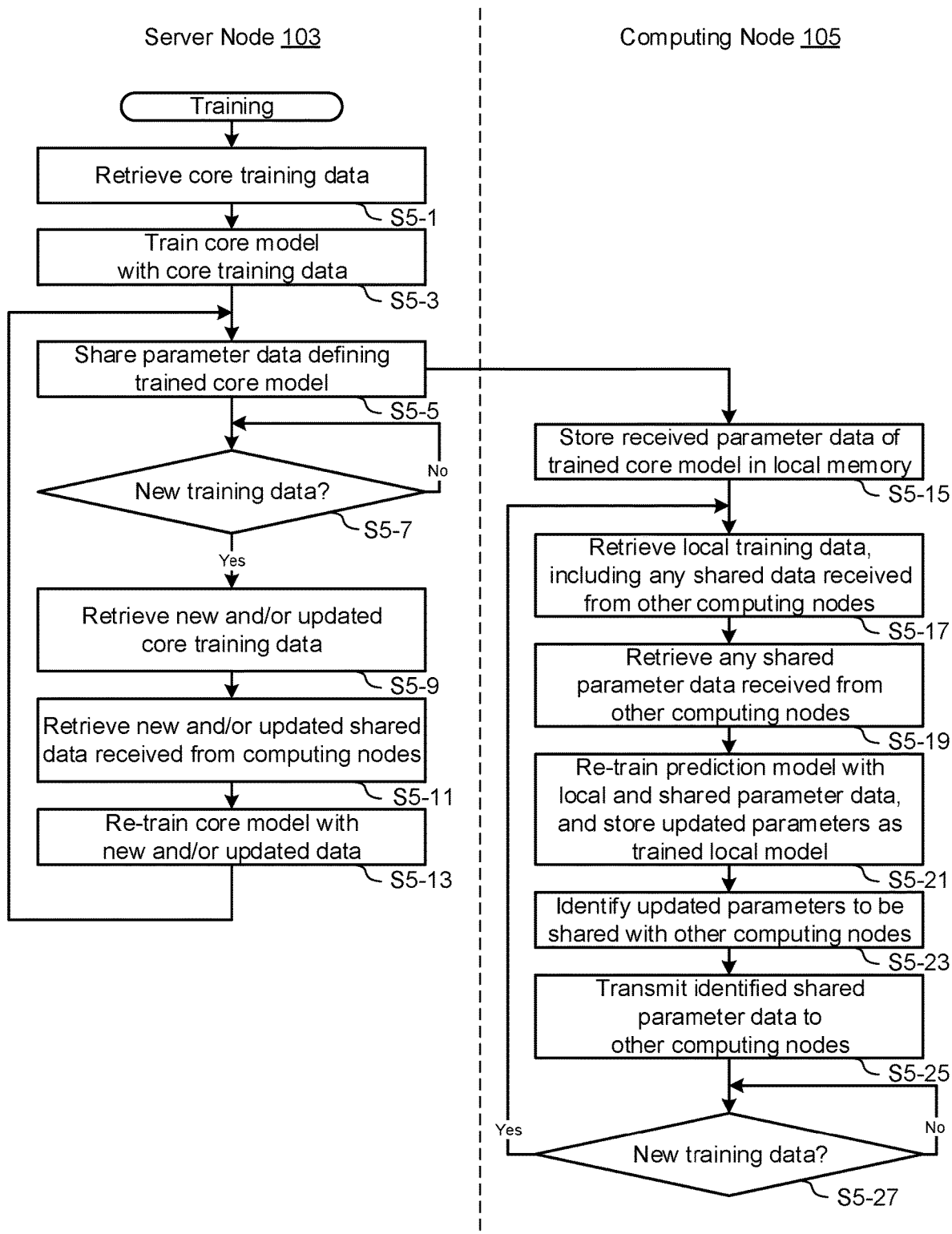
FIG. 5 is a flow diagram illustrating the main processing steps performed by the system components of FIG. 1 according to an embodiment.

FIG. 5 is a flow diagram illustrating a computer-implemented training process to generate a prediction model 113 for predicting outputs to data queries, using the distributed training framework of the system 101, according to an embodiment. As shown in FIG. 5, the process begins at step S5-1 where the training module 115a of the server node 103 retrieves core training data 119, for example from a memory of the server node 103 and/or a remote data storage server. As described above with reference to FIG. 2, the core training data 119 can include individual core training data sets 201, each set defining a collection of core attribute or feature values 203, associated with one or more expected output values 205. Each core training data set 201 may be represented as a data vector of attribute values.

At step S5-3, the training module 115a of the server node 103 processes the core training data 119 to train the core parameters 123 of the core prediction model 113a. The core parameters 123, local parameters 127 and shared parameters 131 of the core prediction model 113a may be initialised to null or random values prior to an iterative core training stage. For example, the training module 115a may analyse individual core training data sets 201 and iteratively update the core parameters 123 to minimize the error between computed predicted output values using the trained core parameter values 123, and expected output values 205 defined by the core training data 119. At step S5-5, the training module 115a passes the trained core parameters 123 to the model sharing module 125a for distribution to corresponding model sharing modules 125b of the interconnected computing nodes 105 of the system 101, via the data network 107. For example, the model sharing module 125a of the server node 103 may be configured to broadcast the trained core parameters 123 as one or more data packets, for direct or indirect receipt by corresponding ones of the interconnected computing nodes 105. The trained core parameters 123 may be associated with a defined lifespan, whereby the computing nodes 105 are configured to periodically update expired core model parameters 123 with current trained core parameters 123 maintained by the server node 103.

At step S5-7, the training module 115a waits for new training data to be provided to the server node 103. For example, the machine learning module 111a of the server node 103 may be configured to periodically retrieve or receive updated core training data objects 203 and/or core training data sets 201. Additionally or alternatively, the server node 103 may be configured to receive new or updated shared data from one or more interconnected computing nodes 105, for example via the model sharing module 125a, that can be used to update the core prediction model 113a. The server node 103 can notify the training module 115a of any new or updated data. In response to determining that new core training data is available, the training module 115a retrieves any new and/or updated core training data 119 at step S5-9, and retrieves any new and/or updated shared data as received from the interconnected computing nodes 105 at step S5-11.

At step S5-13, the training module 115a at the server node 103 processes the new and/or updated core training data 119 to re-train the core parameters 123 of the core prediction model 113a. For example, the training module 115a may analyse attributes of the new and/or updated core training data 119, and repeat the core training process to iteratively update the core parameters 123 to minimize any new error between computed predicted output values and expected output values 205 based on the new and/or updated attributes. As another example, the training module 115a at the server node 103 may receive data from the plurality of computing nodes 105, including processed query attributes and corresponding predicted output values, and use the received data as new training data to update parameters of the re-trained core model 113a. Processing then returns to step S5-5, where the updated core parameters 123 and passed to the model sharing module 125a for distribution to the interconnected computing nodes 105 of the system 101.

At step S5-15, the model sharing module 125b of a computing node 105 receives and stores the trained core parameters 123 from the training module 115a as a local version of the prediction model 113b in a memory of the computing node 105. At step S5-17, the training module 115b of the computing node 105 retrieves local training data 129, for example from a memory of the computing node 105. As described above with reference to FIG. 3, the local training data 129 can include individual training data sets 301, each set defining a collection of local attribute or feature values 303, associated with one or more expected output values 305. The local training data 129 may include shared data 307 received from one or more interconnected computing nodes 105. Each local training data set 301 may be represented as a data vector of attribute values.

At step S5-19, the training module 115a of the server node 103 retrieves any shared parameter data 131 as received from other interconnected computing nodes 105, for example from the model sharing module 125b or a local memory associated therewith. At step S5-21, the training module 115a processes the local training data 129 to re-train the parameters 121a of the core prediction model 113a as received from the server node 103, and stores the updated parameters 121b as the trained local prediction model 113b in a local memory of the computing node 105. For example, the training module 115b may analyse individual local training data sets 301 and iteratively update the core parameters 123, local parameters 127 and shared parameters 131, to minimize the error between computed predicted output values using the trained parameter values 121b, and expected output values 205 defined by the local training data 129.

At step S5-23, the training module 115b identifies a subset of the updated local parameters 127 that are to be distributed as shared parameters 131 to other interconnected computing nodes 5. At step S5-25, the training module 115b passes the identified trained local parameters 127 to the model sharing module 125b of the computing node 105, for distribution as trained shared parameters 131 to corresponding model sharing modules 125b of the interconnected computing nodes 105 of the system 101, via the data network 107. As described above, the model sharing module 125b may be configured to transmit the identified shared parameters 131 to one or more subsets of other interconnected computing nodes 105 based on defined selection criteria, such as geographical and/or network proximity to the distributing computing node, defined relationships, etc.

At step S5-27, the training module 115b waits for new training data to be provided to the computing node 105. For example, the machine learning module 111b of the computing node 105 may be configured to periodically retrieve or receive updated local training data objects 303, shared training data objects 307 and/or local training data sets 301. The computing node 105 can notify the training module 115b of any new or updated data to trigger re-training of the local prediction model 113b. In response to determining that new local training data is available, processing returns to step S5-17 where the training module 115b retrieves any new and/or updated local training data 129, including any new and/or updated shared data as received from other interconnected computing nodes 105, which is subsequently used to re-train the local prediction model 113b as described above with reference to step S5-21.

Figure 6:
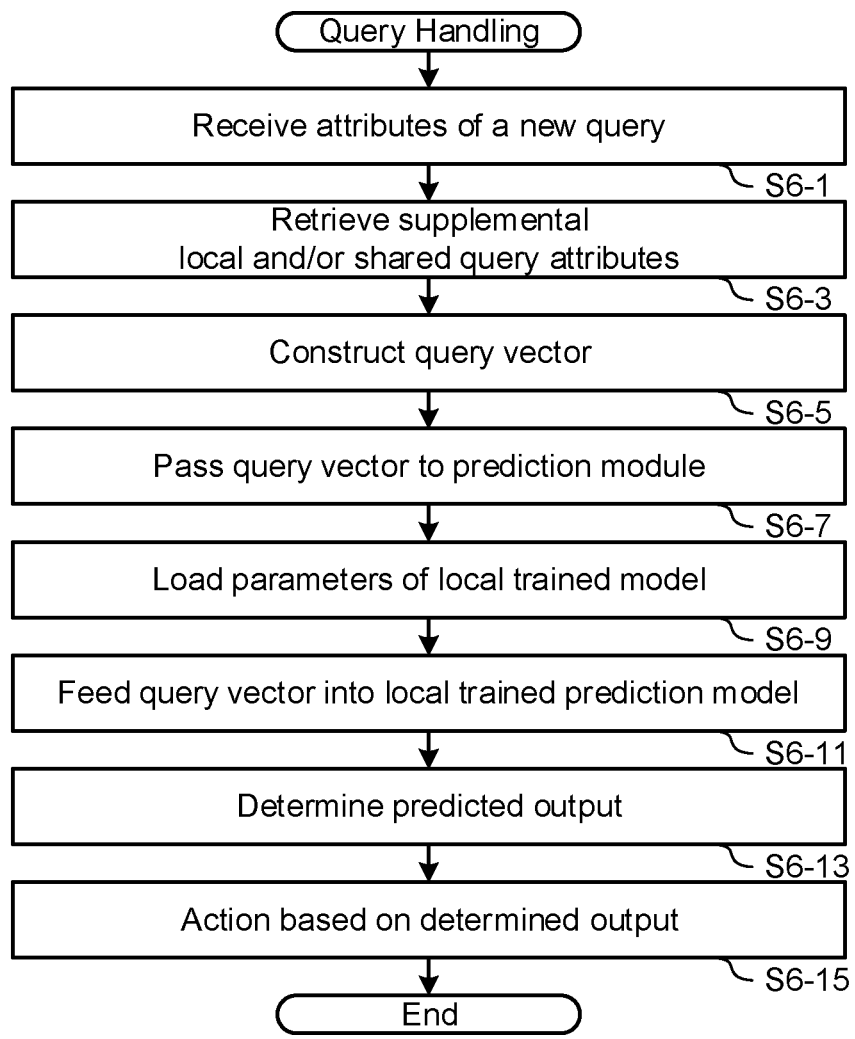
FIG. 6 is a flow diagram illustrating a computer-implemented query handling process to resolve a query using the local prediction model to predict an output based on the attributes of the received query.

FIG. 6 is a flow diagram illustrating a computer-implemented query handling process to resolve a query using the local prediction model 113b to predict an output based on the attributes of the received query, in accordance with another embodiment. As shown in FIG. 6, the process begins at step S6-1 where the query handling module 109 receives query attributes 401 of a new query, for example at the server node 103 or a computing node 105. As described above with reference to FIG. 4, the query attributes 401 may include user input 403 for the new query, defining input query attributes in the same feature space as the training data sets 119,129.

At step S6-3, the query handling module 109 can retrieve additional local data query attributes 405 and/or shared data query attributes 407 to supplement the new query. For example, the local data 405 may include feature representatives of a collection of local data objects 405 that relate to the particular computing node 105 at the time the query handling module 109 receives the input query and/or a user of that computing node 105 initiating the query. The shared data 407 may include feature representatives of a collection of shared data objects 407 that relate to other interconnected computing nodes 105 and/or respective users of those other computing nodes 105 at the time the query handling module 109 receives the input query.

At step S6-5, the query handling module 109 constructs a query vector 401 having query attribute values based on the user input data 403 and any retrieved local data 405 and/or shared data 407. At step S6-7, the query handling module 109 passes the query vector 401 to the prediction module 117 of the server node 103 or computing node 105 that is handling the new query. In response to receiving the query vector 401 for a new query, the prediction module 117 loads the trained parameters 121 of the prediction model 113 from local memory. In the case of a computing node 5 handling a query, the parameters 121b will include the first set of core parameters 123 trained by and received from the server node 103, the second set of local parameters 127 trained by the training module 115b of that computing node 105, and optionally, a third set of shared parameters 131 as received from one or more other interconnected computing nodes via the model sharing module 125b.

At step S6-11, the prediction module 117 receives and processes the query vector 401 to compute a predicted output 409 based on the received query attributes, by feeding the query attribute values as inputs to the trained prediction model 113 to determine the predicted output value or values. Again, in the case of a computing node 5 handling a query, the predicted output will be determined taking into account learned relationships and correspondences between the user input query attributes 403 and any local query attributes 405 and shared query attributes 407, as weighted for example by respective ones of the core parameters 123, local parameters 127, and any shared parameters 131 of the trained model 113. At step S6-13, the prediction module 117 determines the predicted output value or values 409 given by the trained prediction model 113 using the input query attributes. At step S6-15, the predicted output 409 can be passed back to the query handling module 109 as a response to the received query data 401, where the query handling module 109 can determine and effect further action based on the determined output.

Optionally, the input query attributes 403 and the corresponding predicted output 409 may be fed back to the training module 115 for further reinforcement learning of the local prediction model 113. Additionally or alternatively, the input query attributes 403 and the corresponding predicted output 409 may be transmitted to the server node 103, for processing as new training data to update parameters of a re-trained core model 113a.

Exemplary Implementation Context

A specific example of the above system in a particular type of query handling context will now be described with reference to FIG. 7, using corresponding reference numerals to those of preceding figures where appropriate for corresponding elements. In particular, the exemplary designated technical context is the handling of queries for variable data relating to perishable units, where the predicted output values depend at least on core baseline parameters 123 and time-varying local and/or shared parameters 127,131.

The perishable units may be any form of entity having associated attributes defined by constraints, such as time and/or quantity constraints. Purely by way of example, the perishable units may be purchasable tickets for a commercial travel service, each associated with attributes and values such as a travel route, an inventory/stock value, a base or minimum price value, an offer period, and the like. As another example, the perishable units may be hotel rooms or table reservations in a restaurant, again defined by time and quantity constraints. In such example contexts, each core training data set 203 may include a plurality of baseline attributes that are associated with one or more expected output attributes, such as a base or minimum price value. The trained core parameters 123 may represent a core prediction model 113a of a variable pricing curve learned from the core training data set 203. The data queries may be searches for available tickets or travel packages that match or satisfy a given set of query constraints, such as origin and destination locations (which may be cities, regions, countries, airports, etc.), date and/or time periods, availability, upgrade options, or the like.

As yet another example, the perishable units may be physical goods in a warehouse, depot, retail environment, or the like, which are available for search and purchase via an associated e-commerce merchant or service provider. In this example, each core training data set 203 may include baseline attributes such as remaining inventory/stock, expiry date, base retail price, and the like. The baseline attributes may be associated with an expected output attribute such as a modifier value to be applied to the base retail price. The predicted outputs by the trained local prediction model 113b in these examples may be probabilistic, heuristic and deterministic properties of identified perishable units, such as predicted prices and/or price modifiers.

Figure 7:
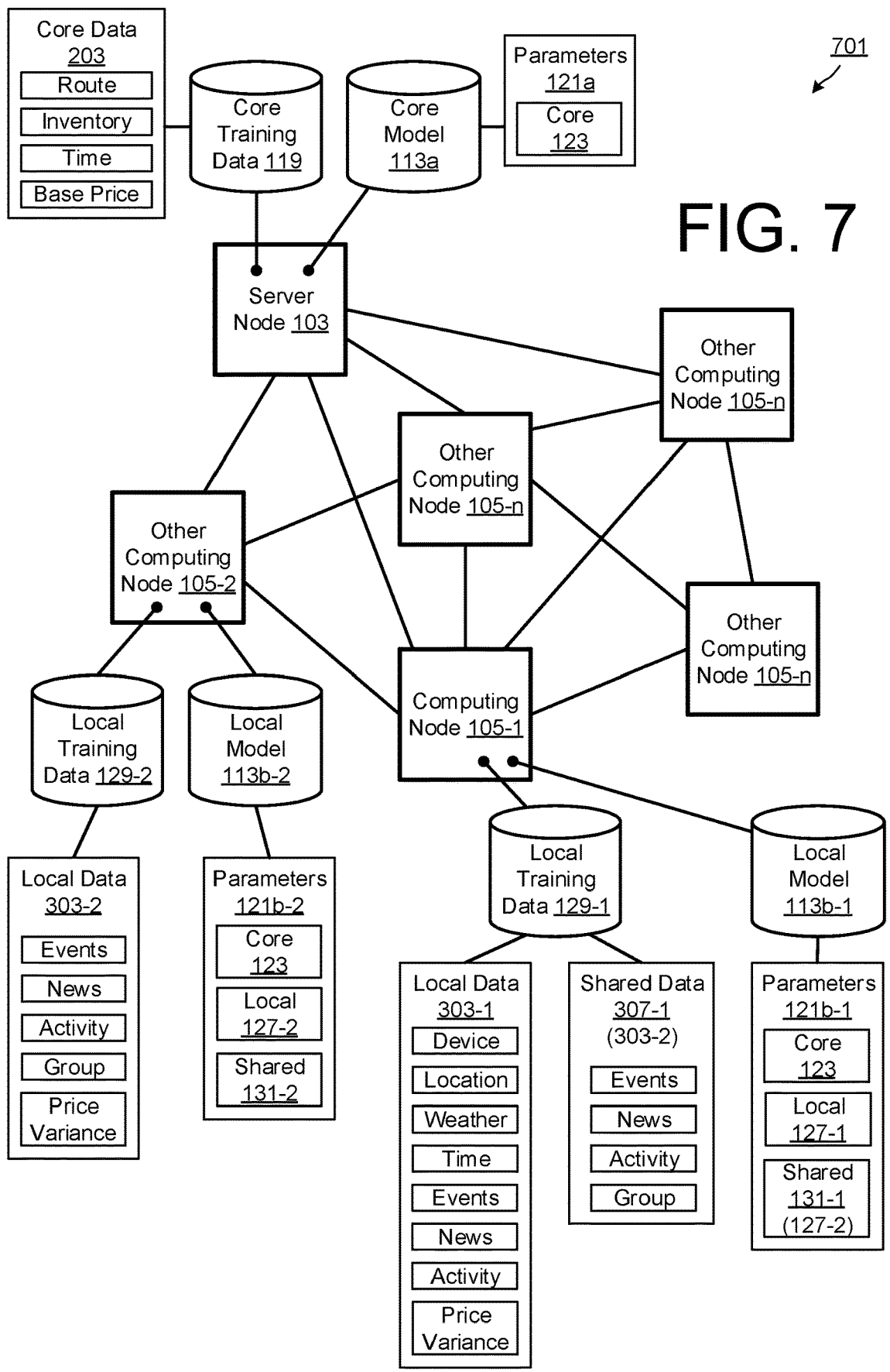
FIG. 7 is a data flow block diagram showing a specific example of the system of FIG. 1 in a particular query handling context.

As shown in FIG. 7, the exemplary query handling system 701 includes a server node 103 communicatively coupled to a plurality of computing nodes 105-1, 105-2, 105-n, each computing node 105 configured to process queries, as described above. The server node 103 and each computing node 105 are also configured to generate respective local prediction models 113 for predicting outputs to received queries, as described above. The server node 103 trains a set of core parameters 123 of the core prediction model 113a, which are distributed to each of the interconnected computing nodes 105 in the system 701.

Purely by way of example in the present designated context, each local training data set 303 may include local/current attributes such as:
- device-related aspects (e.g. from data retrieved from a local memory of the computing node),
- monitored aspects such as current location (e.g. from data collected by sensors on the computing node or such software applications running on the computing node),
- event-related aspects (e.g. from a user's calendar data stored on the computing node or such software applications running on the computing node),
- current news/weather-related aspects at the origin and/or arrival location (e.g. from one or more such data sources or software applications running on the computing node),
- activity-related aspects such as historical queries and responses (e.g. retrieved from local memory of the computing node), etc.

Collections of local/current attributes in the local training data set 303 may be associated with an expected output attribute, such as a price value modifier. A sub-set of these local/current attributes 303 can be defined as sharable attributes 307 that are distributed to other interconnected computing nodes 105. One example set of shared attributes 307-1 is illustrated in the local training data 129-1 of one of the computing nodes 105-1, the source of the shared attributes 307-1 being a subset of the local data 303-2 in the local training data 129-2 from one of the other computing nodes 105-2.

Each computing node 105 re-trains the received set of core parameters 123 of the core prediction model 113a based on the local data sets 303-1,303-2 and shared data sets 307-1 forming the local training data 129, resulting in respective sets of trained parameters 121*b* including the core parameters 123 from the server node 103 and corresponding locally trained local parameters 127, as well as any subsets of shared parameters 131 received from other computing nodes 105. One example subset of shared parameters 131-1 is illustrated in the local prediction model 113*b*-1 of one of the computing nodes 105-1, the source of the shared parameters 131-1 being a subset of the local parameters 127-2 in the local prediction model 113*b*-2 from one of the other computing nodes 105-2. The trained parameters 121*b* of the local prediction model 113*b* may represent a personalised or customised version of the core variable pricing curve, learned from the local and shared training data sets. Each computing node 105 maintains a corresponding local prediction model 113*b* and may continue to update or re-train the parameters 121*b,* independently of the other local prediction models 113*b* in the system.

Each computing node 105 is thereby configured to process data queries using the corresponding local prediction model 113*b* as trained and stored at that node. Each data query may include query attributes and values selected for example from the collection of local/current attributes in the local training data sets 303. For example, a query to retrieve available flight options and prices may include attributes representing an origin city, a target departure date, and event data (including location data) on and around the target departure date, for example retrieved from a user's local calendar. The query attributes may be provided as inputs to the trained local prediction model 113*b* to output one or more possible flight options that match the query origin, date and event location, together with data identifying corresponding predicted availability and prices. The query may further include attributes representing the associated user's historical query activity, which may be taken into account by the trained local prediction model 113*b* to filter the output flight options and/or output available upgrade options based on that user's propensity to select or accept such offers. Such event-based query attributes may also be taken into account by the trained local prediction model 113*b* in computing the predicted prices. As yet a further example, the query may include news-based attributes representing increased activity at the origin and/or destination locations, for example based on retrieved news data, which would also be taken into account by the trained local prediction model 113*b* in computing the predicted prices. The local prediction model 113*b* thereby facilitates prediction of spikes and/or dips in demand, and real-time reaction for example in prediction of an output modeled price or pricing modification, such as an increase or decrease based on both global and local data points.

The data queries may also include query attributes and values associated with one or more related users and/or retrieved from one or more other interconnected computing nodes. For example, the exemplary query above may further include attributes representing mutual event data (including mutual location data) on and around the target departure date, for example based on event data retrieved from shared calendar data of other users in a defined group, such as family members, friends, business associates, etc. The mutual event data attributes may be taken into account by the trained local prediction model 113*b* to output possible flights for example to a common or suitable destination location and/or airport, and within a time frame suitable for all members in the defined group to travel to the identified mutual event. Alternatively or additionally, the query handling module 109 may be configured to pre-process received shared data 307-1 to identify such mutual event and location data, and to generate query attributes representing for example the common or suitable destination location and time frame.

In this particular exemplary type of implementation context, conventional server-based query handling systems typically suffer from significant processing burdens resulting from high look-to-book ratios, that is the percentage of data queries that are handled compared to the number of data queries that convert into actual bookings and/or purchases. This issue is compounded as the system is adapted to facilitate greater flexibility in query generation. The distributed training framework of the present embodiments advantageously address such issues of increased server loads and server bottleneck, by enabling each computing node to process a data query directly, independent of the remote server that maintains the baseline attributes, and to calculate in real-time a predicted output response to the data query. Instead of transmitting the data query to the server, each computing node uses a corresponding trained local prediction model 113*b*, for example to predict values of the temporally-dependent baseline attributes, the nature or type of data query, and/or a query result. Using this distributed training framework, context-specific prediction models can be designed to support increased customisation of input data queries without impacting processing efficiency of the system. Furthermore, the computational and networking resources required to process a particular query are minimal as the computing node handling the query only needs to pass the input query attributes through the trained prediction model.

Additionally, by re-training the parameters of the core prediction model 113*a* as received from the server 103, the local prediction model 113*b* at each computing node 105 is personalised, for example to that computing node and/or a user associated with that computing node 105, whereby at least two of the computing nodes 105 are configured to calculate different predicted outputs to the same input attributes. Updates from the computing nodes 105 may be fed back to the server 103, for example after a defined number or time period of resolved data queries. The updates may include data representing processed search query attributes and the corresponding predicted temporally-dependent baseline attributes. The received updates may be used to automatically adjust the temporally-dependent baseline attributes maintained by the server 103 and/or core parameters 123 of the core prediction model 113*a,* for example by a further re-training stage, which may be subsequently output by the server 103 to update local prediction models 113*b* across the network. In this way, the use of individualised core, local and shared parameters in each local prediction model provides for more dynamic and flexible prediction outcomes that can adapt and vary in real-time according to local/current conditions relevant to the requestor device and/or user.

Example Computer System Implementation

Figure 8:
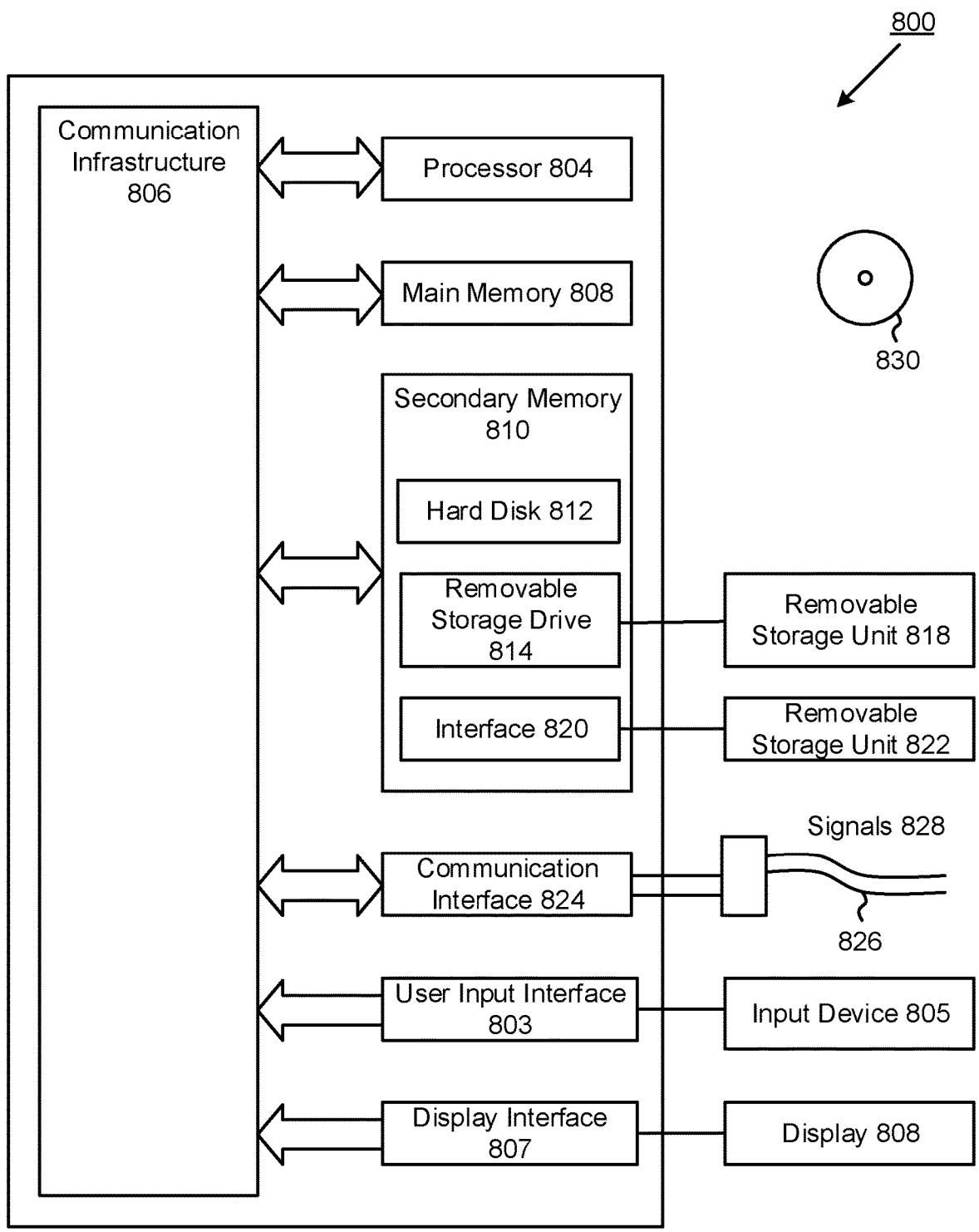
FIG. 8 is a diagram of an example of a computer system on which one or more of the functions of the embodiment may be implemented.

FIG. 8 illustrates an example computer system 800 in which the present invention, or portions thereof, can be implemented as computer-readable code to program processing components of the computer system 800. For example, the methods illustrated by the flowcharts of FIGS. 5 and 6 can be implemented in system 800. The distributed machine learning and prediction architectures of FIG. 1 can also be implemented in system 800. Various embodiments of the invention are described in terms of this example computer system 800. After reading this description, it will become apparent to a person skilled in the relevant art how to implement the invention using other computer systems and/or computer architectures.

Computer system 800 includes one or more processors, such as processor 804. Processor 804 can be a special purpose or a general-purpose processor. Processor 804 is connected to a communication infrastructure 806 (for example, a bus, or network).

Computer system 800 also includes a main memory 808, preferably random access memory (RAM), and may also include a secondary memory 810. Secondary memory 810 may include, for example, a hard disk drive 812, a removable storage drive 814, flash memory, a memory stick, and/or any similar non-volatile storage mechanism. Removable storage drive 814 may comprise a floppy disk drive, a magnetic tape drive, an optical disk drive, a flash memory, or the like. The removable storage drive 814 reads from and/or writes to a removable storage unit 818 in a well-known manner. Removable storage unit 818 may comprise a floppy disk, magnetic tape, optical disk, etc. which is read by and written to by removable storage drive 814. As will be appreciated by persons skilled in the relevant art(s), removable storage unit 818 includes a non-transitory computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Computer system 800 may additionally include computer display 830. According to an embodiment, computer display 830, in conjunction with display interface 802, can be used to display a user interface of a computing node 105. Computer display 830 may also be used to display the query handling module user interface described above with reference to FIG. 1 for example.

Various aspects of the present invention can be implemented by software and/or firmware (also called computer programs, instructions or computer control logic) to program programmable hardware, or hardware including special-purpose hardwired circuits such as application-specific integrated circuits (ASICs), programmable logic devices (PLDs), field-programmable gate arrays (FPGAs), etc. of the computer system 800, or a combination thereof. Computer programs for use in implementing the techniques introduced here may be stored on a machine-readable storage medium and may be executed by one or more general-purpose or special-purpose programmable microprocessors. The terms "computer program medium", "non-transitory computer readable medium" and "computer usable medium" introduced herein can generally refer to media such as removable storage unit 818, removable storage unit 822, and a hard disk installed in hard disk drive 812. Computer program medium, computer readable storage medium, and computer usable medium can also refer to memories, such as main memory 808 and secondary memory 810, which can be memory semiconductors (e.g. DRAMs, etc.). These computer program products are means for providing software to computer system 800.

Computer programs are stored in main memory 808 and/or secondary memory 810. Computer programs may also be received via communications interface 824. Such computer programs, when executed, enable computer system 800 to implement the present invention as described herein. In particular, the computer programs, when executed, enable processor 804 to implement the processes of the present invention, such as the steps in the methods illustrated by flowchart of FIGS. 5 and 6 and system architecture of FIG. 1 described above. Accordingly, such computer programs represent controllers of the computer system 800. Where the invention is implemented using software, the software may be stored in a computer program product and loaded into computer system 800 using removable storage drive 814, interface 820, hard drive 812, or communications interface 824.

Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage device, etc.), and communication mediums (e.g., wired and wireless communications networks, local area networks, wide area networks, intranets, etc.).

Alternative Embodiments

It will be understood that embodiments of the present invention are described herein by way of example only, and that various changes and modifications may be made without departing from the scope of the invention.

For example, it will be appreciated that although the respective processes and associated processing modules are described as separate embodiments, aspects of the described embodiments can be combined to form further embodiments. For example, alternative embodiments may comprise one or more of the training and prediction aspects described in the above embodiments.

Reference in this specification to "one embodiment" are not necessarily all referring to the same embodiment, nor are separate or alternative embodiments mutually exclusive of other embodiments. In particular, it will be appreciated that aspects of the above described embodiments can be combined to form further embodiments. Similarly, various features are described which may be exhibited by some embodiments and not by others. Yet further alternative embodiments may be envisaged, which nevertheless fall within the scope of the following claims.

The invention claimed is:

1. A method comprising:
    storing, at a first computing device in a computer network, data defining a local prediction model including:
    a first set of trained parameter values received from a remote server in the computer network that maintains at least one temporally-dependent attribute of a plurality of perishable units,
    a second set of trained parameter values received from a second computing device in the computer network, and
    a third set of local parameter values generated by the first computing device;

applying, by the first computing device, a machine learning algorithm to compute updated parameter values of the local prediction model based at least on data associated with the first computing device;

receiving, by the first computing device, an updated first set of trained parameter values from the remote server;

applying, by the first computing device, the machine learning algorithm to compute re-trained parameter values of the local prediction model based at least on the received updated first set of trained parameter values and the data associated with the first computing device; and processing, by the first computing device, a data query using the trained local prediction model, to identify at least one perishable unit and to predict a value of at least one temporal query attribute of the or each identified perishable unit.

2. The method of claim 1, wherein the data query is processed using the updated parameter values of the trained local prediction model and data retrieved from a memory of the first computing device.

3. The method of claim 2, wherein the data query further comprises query attributes including the data retrieved from the memory of the first computing device.

4. The method of claim 3, wherein the query attributes further include data retrieved from a plurality of disparate data sources.

5. The method of claim 3, wherein processing the data query using the updated parameters of the local prediction model further identifies a predicted query type.

6. The method of claim 1, further comprising initialising a query vector representing query attributes of the data query, and passing the query vector as input to the trained prediction model.

7. The method of claim 1, wherein the data query is received by the first computing device from a different computing device on the network.

8. The method of claim 1, further comprising providing the predicted output as feedback to a query handling controller of the first computing device.

9. The method of claim 1, further comprising transmitting, by the first computing device, the updated first set of parameters of the local prediction model to the remote server.

10. The method of claim 1, wherein the predicted value is one or more of a probabilistic, heuristic and deterministic property of the identified perishable unit.

11. The method of claim 1, wherein the third set of local parameter values are initialised, by the first computing device, with random values.

12. The method of claim 1, wherein the updated parameter values of the trained local prediction model are computed based on a training data set that includes data associated with the first computing device.

13. The method of claim 12, wherein the training data set includes metadata associated with a plurality of perishable units.

14. The method of claim 13, wherein the training data set further includes output attributes associated with metadata of the plurality of perishable units in the data set.

15. The method of claim 12, wherein the training data set includes:
a first data subset received from the remote server;
a second data subset received from the second computing device; and
a third data subset retrieved from a local memory of the first computing device.

16. The method of claim 1, wherein the data associated with the first computing device includes one or more of location data, calendar data, accelerometer data, gyroscope data, user settings, third party application data, and device type.

17. The method of claim 1, wherein the third set of local parameter values define weighting values for corresponding ones of the first set of trained parameter values.

18. The method of claim 1, further comprising iteratively updating the parameters of the local prediction model based on new input data.

19. An apparatus comprising:
one or more network interfaces to communicate with a remote server and other computing devices in a computer network;
a processor coupled to the network interfaces and operable to execute program instructions; and
a memory configured to store the program instructions that, when executed by the processor, configure the processor to perform a method comprising:
storing, at a first computing device in a computer network, data defining a local prediction model including:
a first set of trained parameter values received from a remote server in the computer network that maintains at least one temporally-dependent attribute of a plurality of perishable units,
a second set of trained parameter values received from a second computing device in the computer network, and
a third set of local parameter values generated by the first computing device;
applying, by the first computing device, a machine learning algorithm to compute updated parameter values of the local prediction model based at least on data associated with the first computing device;
receiving, by the first computing device, an updated first set of trained parameter values from the remote server;
applying, by the first computing device, the machine learning algorithm to compute re-trained parameter values of the local prediction model based at least on the received updated first set of trained parameter values and the data associated with the first computing device; and
processing, by the first computing device, a data query using the trained local prediction model, to identify at least one perishable unit and to predict a value of at least one temporal query attribute of the or each identified perishable unit.

20. A non-transitory storage medium comprising machine readable instructions stored thereon that when executed cause a computer system to perform a method comprising:
storing, at a first computing device in a computer network, data defining a local prediction model including:
a first set of trained parameter values received from a remote server in the computer network that maintains at least one temporally-dependent attribute of a plurality of perishable units,
a second set of trained parameter values received from a second computing device in the computer network, and
a third set of local parameter values generated by the first computing device;
applying, by the first computing device, a machine learning algorithm to compute updated parameter values of the local prediction model based at least on data associated with the first computing device;

receiving, by the first computing device, an updated first set of trained parameter values from the remote server;

applying, by the first computing device, the machine learning algorithm to compute re-trained parameter values of the local prediction model based at least on the received updated first set of trained parameter values and the data associated with the first computing device; and processing, by the first computing device, a data query using the trained local prediction model, to identify at least one perishable unit and to predict a value of at least one temporal query attribute of the or each identified perishable unit.

* * * * *